April 21, 1936. W. COLE Re. 19,941

CUTTING-OFF MECHANISM IN CIGARETTE MAKING AND SIMILAR MACHINES

Original Filed Jan. 27, 1928 7 Sheets-Sheet 1

Inventor:
William Cole,
By Toulmin & Toulmin,
Attorneys.

April 21, 1936. W. COLE Re. 19,941

CUTTING-OFF MECHANISM IN CIGARETTE MAKING AND SIMILAR MACHINES

Original Filed Jan. 27, 1928 7 Sheets-Sheet 2

Inventor:
William Cole,
By Houlman & Houlman,
Attorneys.

April 21, 1936. W. COLE Re. 19,941

CUTTING-OFF MECHANISM IN CIGARETTE MAKING AND SIMILAR MACHINES

Original Filed Jan. 27, 1928 7 Sheets-Sheet 3

Inventor:
William Cole,
By Toulmin & Toulmin,
Attorneys.

April 21, 1936. W. COLE Re. 19,941

CUTTING-OFF MECHANISM IN CIGARETTE MAKING AND SIMILAR MACHINES

Original Filed Jan. 27, 1928 7 Sheets-Sheet 4

Inventor:
William Cole,
By Toulmin & Toulmin
Attorneys.

April 21, 1936. W. COLE Re. 19,941

CUTTING-OFF MECHANISM IN CIGARETTE MAKING AND SIMILAR MACHINES

Original Filed Jan. 27, 1928 7 Sheets-Sheet 5

Inventor:
William Cole,
By Toulmin & Toulmin,
Attorneys.

April 21, 1936. W. COLE Re. 19,941

CUTTING-OFF MECHANISM IN CIGARETTE MAKING AND SIMILAR MACHINES

Original Filed Jan. 27, 1928 7 Sheets-Sheet 6

Inventor:
William Cole,
By Toulmin & Toulmin
Attorneys.

April 21, 1936. W. COLE Re. 19,941

CUTTING-OFF MECHANISM IN CIGARETTE MAKING AND SIMILAR MACHINES

Original Filed Jan. 27, 1928 7 Sheets-Sheet 7

Inventor:
William Cole
By Toulmin & Toulmin
Attorneys.

Reissued Apr. 21, 1936 Re. 19,941

UNITED STATES PATENT OFFICE 19,941

CUTTING-OFF MECHANISM IN CIGARETTE MAKING AND SIMILAR MACHINES

William Cole, Bristol, England, assignor, by mesne assignments, to Molins Machine Company, Limited, London, England Original No. 1,928,481, dated September 26, 1933, Serial No. 249,950, January 27, 1928. Application for reissue November 13, 1934, Serial No. 752,896. In Great Britain January 31, 1927

47 Claims. (Cl. 131—37)

This invention relates to cutters, sharpeners and ledger plates of cut-off mechanisms in cigarette making and similar machines of the type in which the desired form of cutting edge describes a surface through space and in which a continuous rod of material to be cut is moved continuously and uniformly in a lengthwise direction and wherein the cutting edge and portions of the cutter which contact with the rod, have a component of movement approximately equal to, and in the direction of, the feed of the rod where the rod is being severed and while the cutter is in contact with the rod; the surfaces of that portion of the cutter which passes through the rod approximately coinciding, while severing, with the surfaces of the severed ends of the rod in order to avoid excessively damaging the rod.

In cutting-off mechanisms of this type the aforesaid surface described by the cutting edge may be of any form or may be a surface of revolution. The cutter may revolve about a fixed axis and in doing so the cutting edge may describe a surface of revolution formed about the said fixed axis or not.

The object of this invention is to provide an improved sharpener, ledger plate and cutter for cut-off mechanisms of this type.

For the purpose of illustrating the application of this invention to a cut-off mechanism in which the cutter is revolving bodily about a fixed axis and in which the cutting edge describes a surface of revolution about the fixed axis of bodily revolution, which is also the axis of formation of the surface described by the cutting edge, a mechanism embodying a revolving helically formed cutter is described, but it is to be understood that the invention can be applied to other forms of revolving cutters, and the application of this invention is not limited to helical cutters. Two other methods of applying this invention are illustrated and described herein; in one case the cutter is moved on an elliptical path, and in the other case the cutter has a revolving motion combined with an oscillating motion in an axial direction.

Where helical cutters have previously been employed, they have been used in combination with an oscillating sharpener and an oscillating or moving ledger plate in order to enable the sharpener and ledger plate to main'ain contact with the progressing cutting edge.

In a cutting-off mechanism of the type described, a main sharpener made according to this invention is characterized in that it is non-oscillating and is formed and arranged so that the portion of the working surface which comes into actual contact with the cutting edge is adapted to be brought into coincidence with that portion of the surface described through space by the cutting edge where the main sharpener is applied.

In a cutting-off mechanism of the type described and in which the cutter is presented at a suitable angle to some portion of the surface described through space by the cutting edge to enable the cutter to be sharpened upon a surface coinciding with the said surface described by the cutting edge, a main sharpener made according to this invention is characterized in that it is non-oscillating and is formed and arranged so that the portion of the working surface which comes into actual contact with the cutting edge is adapted to be brought into coincidence with that portion of the surface described through space by the cutting edge where the main sharpener is applied.

The main sharpener may be stationary while sharpening and constructed with the whole of the working surface formed to coincide as a whole and adapted to be brought into coincidence with that portion of the surface described through space by the cutting edge, where the main sharpener is applied.

In an alternative form the non-oscillating main sharpener may be stationary or not and may be formed and arranged so that the portion of the working surface actually contacting with the cutting edge of the cutter, is adapted to be brought into coincidence with a line upon and across that portion of the surface described by the cutting edge, where the main sharpener is applied.

The non-oscillating main sharpener may also be formed and arranged with a working surface formed as a surface of revolution about any convenient axis of formation and the portion of the working surface which actually contacts with the cutting edge is adapted to be brought into coincidence with a line upon and across that portion of the surface described by the cutting edge, where the main sharpener is applied. Where the main sharpener is formed as a surface of revolution, it may be caused or allowed to rotate about the axis of formation, as desired.

Where the cutter revolves about a fixed axis, and the cutting edge describes a surface of revolution about, and co-axial with, the said fixed axis, the main sharpener may be stationary and the working surface of the main sharpener is then formed as a portion of a surface of revolution coinciding as a whole with that portion of the co-axial surface of revolution described by the cutting edge, where the main sharpener is applied.

The main sharpener may be revolved about a fixed axis and the working surface may be of helical form and adapted to be revolved about the axis of the helix, or may be in the form of a rotating disc disposed approximately transversely to, and intercepting the path of, the cutter, and rotated synchronously with the cutter, the said rotating disc having a portion removed to allow the passage of the cutter and the remaining portion having a working surface with a profile arranged to follow the progressive movement of the cutting edge and sharpen the cutter by contact therewith.

According to this invention an auxiliary sharpener may be provided to form the surface of the cutter which intersects the surface formed by the main sharpener, the cutting edge then lying at the intersection of the two surfaces formed by the main and auxiliary sharpeners, respectively. The working surface of the auxiliary sharpener, where in contact with the cutting edge, must have a component of movement approximately equal to, and in the same direction as, the component of movement of the cutting edge, where the auxiliary sharpener is applied so as to maintain contact between the auxiliary sharpener and the cutting edge.

The auxiliary sharpener may have an oscillating movement or a continuously revolving movement as shown hereinafter with reference to the drawings.

A ledger plate made in accordance with this invention is stationary and the working surface of the ledger plate across which the cutting edge sweeps, is formed and arranged to approximately coincide with that portion of the surface described through space by the cutting edge of the cutter, where the ledger plate is located. Where the cutter revolves about a fixed axis, and the cutting edge describes a surface of revolution about, and co-axial with, the said fixed axis, the working surface of the ledger plate is formed and arranged to approximately coincide with that portion of the said co-axial surface of revolution described by the cutting edge, where the ledger plate is located.

A cutter made in accordance with this invention is characterized by having a cutting edge which has been formed and sharpened upon a non-oscillating main sharpener made in accordance with this invention.

In a cutting-off mechanism of the type described and in which the cutter is presented at a suitable angle to some portion of the surface described through space by the cutting edge, to enable the cutter to be sharpened upon a surface coinciding with the said surface described by the cutting edge, a cutter is characterized by having a surface formed by or identical with a surface formed by a non-oscillating stationary main sharpener made in accordance with this invention, said sharpener being constructed with the whole of the working surface formed to coincide as a whole and adapted to be brought into coincidence with that portion of the surface described through space by the cutting edge, where the main sharpener is applied.

If the cutter is revolving about a fixed axis of revolution and the cutting edge describes a surface of revolution, the surface formed upon the cutter by the said non-oscillating stationary main sharpener coincides with the surface of revolution described by the cutting edge where the said sharpener is applied.

Where the cutter revolves about a fixed axis, and the cutting edge describes a surface of revolution formed about, and co-axial with the said fixed axis, the surface formed on the cutter by the main sharpener coincides with that portion of the said co-axial surface of revolution, where the main sharpener is applied.

A helical cutter made in accordance with this invention is continually revolved with uniform angular velocity about the axis of the helix and is characterized by having a cutting edge formed by the intersection of two surfaces. One of the said intersecting surfaces is formed as a portion of a surface of revolution of any desired or predetermined form and is co-axial with the axis of the helix of said cutter, said surface being hereinafter referred to as the "co-axial intersecting surface". This said co-axial intersecting surface intersects one of the main helical surfaces of the cutter or a bevel (which may have been formed by the aforesaid auxiliary sharpener) on the said main helical surface thereby forming the cutting edge at the said intersection. The cutting edge formed by the said intersection has a constant pitch measured in the direction of the axis of the rod where being severed. When the helical cutter is revolved about the axis of the helix the cutting edge describes a surface of revolution coinciding with the aforesaid co-axial intersecting surface. The surface of the cutter while in contact with the severed ends of the rod must have a component of movement approximately equal to, and in the direction of, the feed of the rod where being severed.

In the preferred form the cutter is constructed as a thin blade of the wafer type and both the main surfaces of that portion of the cutter which passes through the rod coincide as closely as possible (while severing) with the surface of the severed ends of the rod.

A cutter made in accordance with this invention and which revolves about a fixed axis, is, or may be, provided with means for feeding the cutter to compensate for wear, such means to be operable while the mechanism is in use. The said means comprise an operating member arranged to be moved in either direction by any means along the said fixed axis of revolution of the cutter and revolving with the cutter, the said operating member having a surface or surfaces inclined to the said fixed axis of revolution which engage with a surface or surfaces formed upon the cutter or cutter carrier. An axial movement of the said operating member causes the cutter to be fed forward or withdrawn. One form of feeding device is illustrated hereinafter as applied to a helical cutter.

A cutter made in accordance with this invention and having a sufficient degree of flexibility, is or may be provided with means for forming the cutter into a helical form by warping or twisting the cutter between or against abutments and is, or may be, provided with means for adjusting the abutments to obtain a helical form of a different pitch. The cutter is preferably made from a flat sheet of suitable material of desired flexibility and is warped into the desired helical form by being located between or against abutments, the surfaces of which where in contact with the cutter are located upon the predetermined helical form to which the cutter is to be formed.

For a cutter having an adjustable pitch, the abutments preferably have narrow contact surfaces arranged in any one of three positions, namely, radially, perpendicularly to a radius or concentrically with the axis of the helix, when viewed along the axis of the helix.

Referring to the drawings filed herewith:

Figures 23 and 24 are diagrammatic elevations of the auxiliary sharpener illustrated in Figures 10 and 11, showing the relative positions of the cutter and auxiliary sharpener at the commencement and finish of the contact period.

Figure 1:
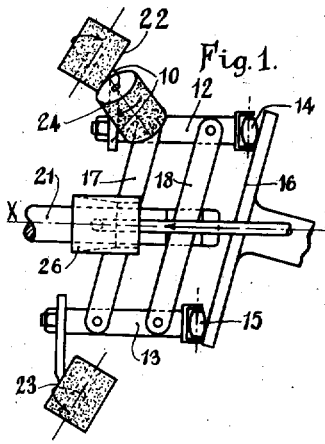
Figure 1 is a diagrammatic elevation of one form of cut-off mechanism of the type described showing one method of applying the invention.
Figure 2:
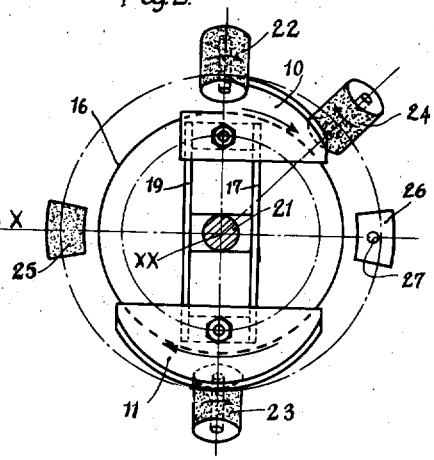
Figure 2 is an end view of Figure 1.
Figure 3:
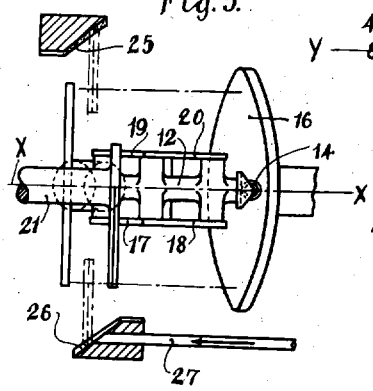
Figure 3 is a plan of Figure 1.

In the cut-off mechanism shown diagrammatically in Figures 1, 2, and 3, two cutters 10 and 11 are mounted diametrically opposite and adapted to be rotated about the axis XX. The cutters are mounted on carriers 12 and 13 having rollers 14 and 15 which co-act with the swash-plate 16. The carriers 12 and 13 are pivotally secured to links 17, 18, 19, and 20 which are in turn pivotally and centrally mounted upon the shaft 21, the whole forming a parallel link motion which maintains the cutters always perpendicular to the axis XX. The rollers 14 and 15 in rolling around the wash-plate 16 are given an oscillating movement along the axis XX and impart the required axial progression to the cutters. This cutter mechanism has already been described in the specification of British Letters Patent No. 248,415 of 1926 (Molins). No claim is made to anything claimed therein. This mechanism is illustrated here by way of example to show how the present invention can be applied to existing machines which come within the type defined.

The cutting edge of the cutters 10 and 11 have a radial variation measured from the axis XX so that the rod is cut with a slicing action. The cutting edges of the cutters describe surfaces in space parallel to the swash-plate 16. The sharpeners 22, 23, and 24 are non-oscillating and cylindrical and each is arranged to be rotated by means not shown about its own axis, if desired. The portion of the working surface of the sharpener, where in actual contact with the cutter, coincides with that portion of the surface described through space by the cutting edge, where the sharpener is applied. The sharpener 25 is formed with the whole of the working surface adapted to coincide with that portion of the surface described through space by the cutting edge where the sharpener is applied. The sharpeners are not limited in application to the positions illustrated provided the before-mentioned conditions are satisfied. The sharpeners 22 and 25 as arranged, sharpen the cutter upon one face and the sharpeners 23 and 24 sharpen the cutter upon the opposite face. The number of sharpeners employed is optional and if more than one is employed they may be of different grades of material.

As illustrated, the profiles of the cutting edges of the cutters 10 and 11 approximate very closely to circular arcs, and it will be seen that quite a considerable arc can be sharpened, as is shown by the cutter 11. If a complete circular cutter is employed, which is rotated about the center of the cutter, the whole circumferential edge can be sharpened.

The ledger plate 26, which is pierced to allow of the passage of the rod 27, is non-oscillating, and is located where the axial component of movement of the cutter is approximately equal to, and in the same direction as, the feed of the rod. The working surface of the ledger plate 26 is formed and arranged to approximately coincide with that particular portion of the surface described through space by the cutting edge of the cutter, where the ledger plate is located.

The length of cigarettes cut off can be varied by altering the angle of inclination of the swash-plate and the speed of revolution of the cutter about the axis XX. The sharpeners must then be arranged so that the portion of the working surface of each sharpener, where in actual contact with the cutter, coincides with the modified surface described through space by the cutting edge. A similar adjustment will have to be made to the ledger plate.

Figure 4:
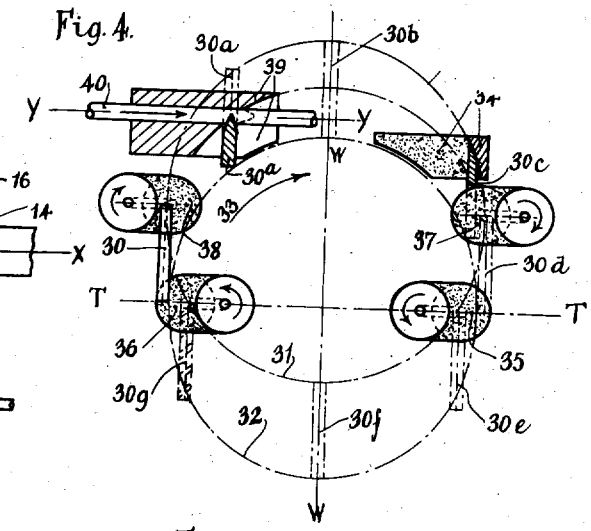
Figure 4 is a diagrammatic plan of another form of cut-off mechanism of the type described showing the method of applying this invention to a cutter moving in an elliptical path.
Figure 5:
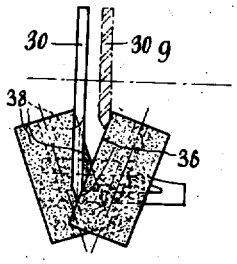
Figure 5 is a part diagrammatic elevation of Figure 4.
Figure 6:
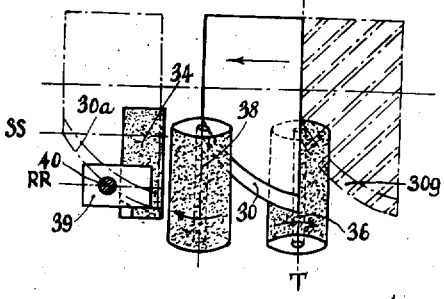
Figure 6 is an end view of Figure 5.

Referring now to the mechanism illustrated in Figures 4, 5, and 6, the cutter 30 is moved in the direction of the curved arrow 33 on a closed elliptic path, shown by dotted lines 31 and 32 in Figure 4, the cutter being shown in various positions at **30*a*, 30*b*, 30*c*, 30*d*, 30*e*, 30*f*, and 30*g*. The cutter surfaces are always maintained parallel to the major axis WW of the ellipse, and the two elliptical paths 31 and 32 shown by the dotted lines are described by the extremities of the cutting edge. The non-oscillating sharpener 34 has a working surface formed and adapted to be brought into coincidence with the surface described through space by the cutting edge of the cutter 30. The position for applying the sharpener is determined by selecting a position where the cutter is presented to the surface described through space by the cutting edge at the desired angle. The sharpener 34 is shown in one suitable position (see Figure 4). The sharpener 34 as shown operates on one surface only of the cutter. If it is desired to sharpen the other surface, a similar sharpener can be employed in a similar position on the adjacent quarter of the elliptic path, both sharpeners being on the same side of the minor axis of the elliptical path. The sharpeners 35, 36, 37, and 38** are non-oscillating and cylindrical, and each is arranged to be rotated by means not shown about its own axis, if desired. The portion of the working surface of each sharpener, where in actual contact with the cutter, coincides with that portion of the surface described through space by the cutting edge, where the sharpener is applied.

Sharpeners 35 and 38 sharpen one face of the cutter, and sharpeners 36 and 37 sharpen the other face. The sharpeners are not limited in application to the positions illustrated, provided the before-mentioned conditions are satisfied. The number of sharpeners employed is optional, and, if more than one sharpener is employed, they may be of different grades of material.

The ledger plate 39, which is pierced to allow of the passage of the rod 40, is non-oscillating and is located where the cutter 30 has a component of movement in relation to the axis of the rod 40, approximately equal to, and in the same direction as, the feed of the rod. The working surface of the ledger plate 39 is formed and arranged to approximately coincide with that particular portion of the surface described through space by the cutting edge of the cutter, where the ledger plate is located.

If the elliptical path is varied for any reason, as, for example, in order to vary the length of cigarette cut off, then the sharpeners must be adjusted so that the portion of the working surface of each sharpener, where in actual contact with the cutter, coincides with the modified surface described by the cutting edge. A similar adjustment will have to be made to the ledger plate.

Referring again to the drawings, the cutter 30 in the position 30*g* is commencing to contact with the sharpener 36. In the position 30 the sharpener is just finishing contact with the sharpener 36. During this operation, the contact between the cutting edge and the sharpener traverses downwardly along the inclined surface of the sharpener 36. This progressive movement is clearly illustrated in the drawings. The cutter contacts with the sharpener 35 in a similar manner, but the traverse is in an upward direction.

The cutter 30 is shown at 30 commencing to contact with the sharpener 38 and in travelling along the elliptic paths, the contact between the cutting edge and the sharpener traverses downwardly along the inclined surface of the sharpener 38. The cutter contacts with the sharpener 37 in a similar manner, but the traverse is in an upward direction.

The cutter 30 is shown at 30*a* in action severing the cigarette rod 40, the plane of section of the ledger plate and cutter being through the axis YY of the rod along the line RR, Figure 6.

The cutter 30 is shown at 30*c* in contact with the sharpener 34, and is a section along the line SS, Figure 6.

The mechanism for moving the cutter along the elliptical paths is well-known, and is illustrated here to show the application of the present invention to a cut-off mechanism of the type having an elliptic path. The invention may be applied in like manner to a similar mechanism in which the cutter moves on a circular instead of an elliptical path, the cutting edge then describing a surface of revolution which is not formed about an axis of formation.

Figure 7:
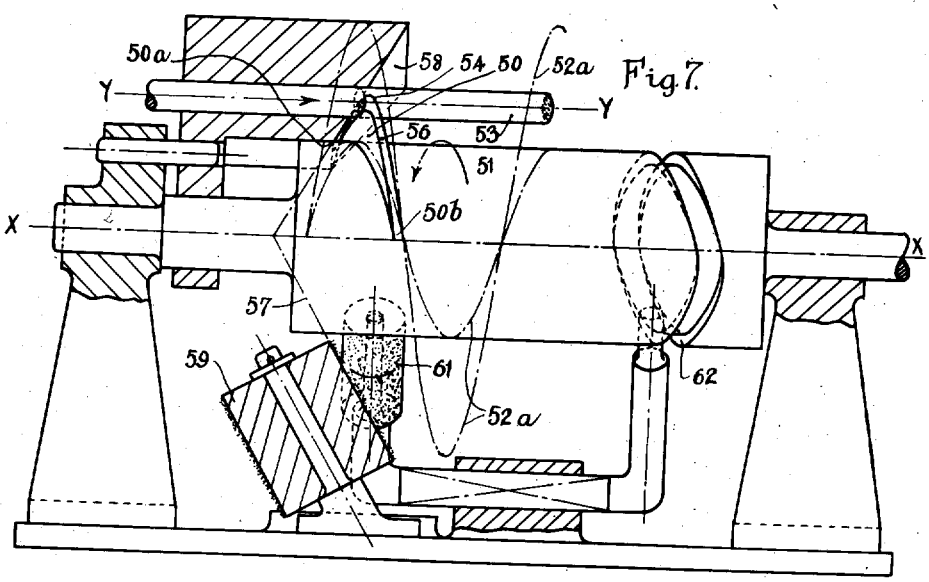
Figure 7 is a diagrammatic front elevation.
Figure 8:
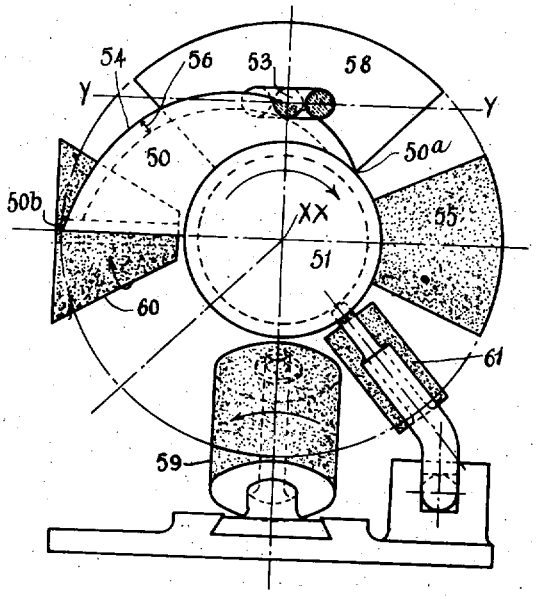
Figure 8 is a diagrammatic end elevation.
Figure 9:
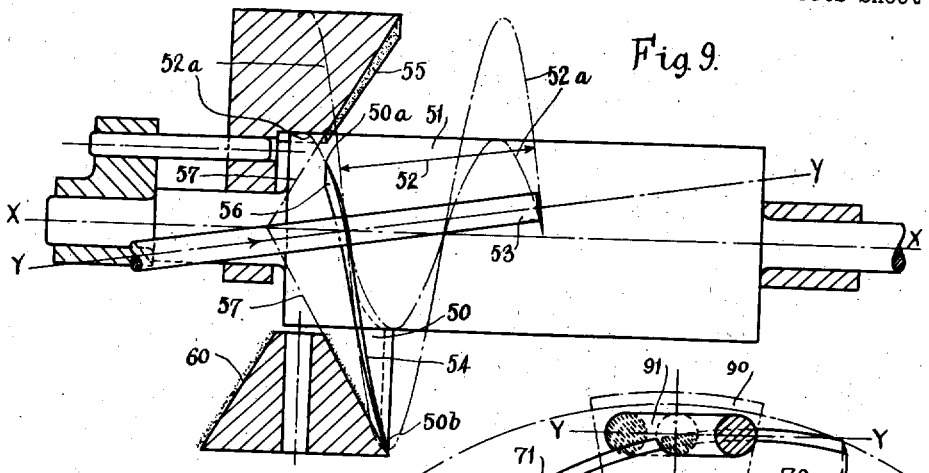
Figure 9 is a diagrammatic plan of one form of cut-off mechanism in which a helical form of cutter is employed.

In the construction shown in Figures 7, 8, and 9 of the drawings, the cutter 50 is formed as a portion of a helical screw thread developed upon a cylinder 51 and adapted to be revolved about the axis XX. The normal pitch 52 of the helix 52*a* is equal to the length of cigarette rod 53 to be cut off.

The two main helical surfaces of the cutter 50 have a constant pitch and as the cutter is continuously rotated with uniform angular velocity about the axis XX, the progression of said surfaces is constant and is arranged to be equal to the feed of the cigarette rod 53. It is only necessary, therefore, to arrange that the keen cutting edge 54 lies wholly on one of these main helical surfaces and this is obtained in the following manner. The stationary surface sharpener 55 has a working surface formed as a segment of a cone arranged co-axially with axis XX and generates upon the cutter a surface 56 which intersects the main helical surfaces of the cutter, the surface 56 so formed extending from one main helical surface of the cutter to the keen cutting edge 54 lying wholly on the other main helical surface of the cutter.

The profile of cutting edge 54 of the cutter 50 is thus ground by the surface sharpener 55 to the form or an Archimedean spiral when viewed along the axis XX (see Figure 8). The cutting edge 54 and the surface 56 describe a conical surface of revolution 57 coinciding with the working surface of the sharpener 55. The axis YY of the cigarette rod 53 is disposed normally to the main helical surfaces of the cutter 50 and, therefore, inclined to the axis XX as shown in Figure 9. It is, of course, obvious that the axis YY of the cigarette rod 53 must be inclined in this manner to the axis of the helical cutter so as to obtain a square cut.

The profile of the cutter and the angle of formation of the cutting edge (i. e., the angle of presentation of the cutter to the surface described by the cutting edge) is governed by three factors:—

(1) Diameter of helix;

(2) Pitch of helix; and (3) The angular rotation of the cutter necessary to effect severance of the rod.

This will be apparent by considering the drawings. The cutter 50 shown in Figures 7, 8, and 9 is formed from a 135° segment of a turn of the helix, the angular position of the leading point 50*a* of the cutting edge being 135° in advance of the trailing point 50*b*. On looking at the helical knife in Figure 7 it will be seen that the leading point 50*a* is ⅜ of the length of the pitch of the helix in advance of the trailing point 50*b*. Referring to Figure 8, the radius measured from the axis XX of the helix increases from a minimum at the point 50*a* to a maximum at the point 50*b* in ⅜ of the pitch. Considering now Figures 7, 8, and 9, it will be seen that this determines the angle of the surface sharpener 55.

If other shapes of the surface of revolution are employed, then the shape of the cutter 50, when viewed along the axis of the helix, will be varied from the Archimedean form shown in the drawings, but the same principles apply.

A non-oscillating sharpener 59 with a cylindrical working surface is shown mounted about the axis of the cylinder and any portion of the cylindrical working surface can be brought into coincidence with the conical surface of revolution 57.

A non-oscillating sharpener 60 with a conical working surface is shown mounted about the axis of the cone, and any portion of the conical working surface can be brought into coincidence with the conical surface of revolution 57.

An oscillating auxiliary cylindrical sharpener 61 is shown. This operates to remove any burr produced by the sharpeners 55, 59 or 60 and is shown diagrammatically operated by the cam groove 62.

The stationary ledger plate 58 is formed as a portion of a conical surface co-axial with the axis XX and coinciding with the conical surface of revolution 57, and it will be seen that the cutting edge 54 of the cutter and the surface 56 will sweep over the surface of the ledger plate 58 with light contact, or any desired clearance.

Figure 11:
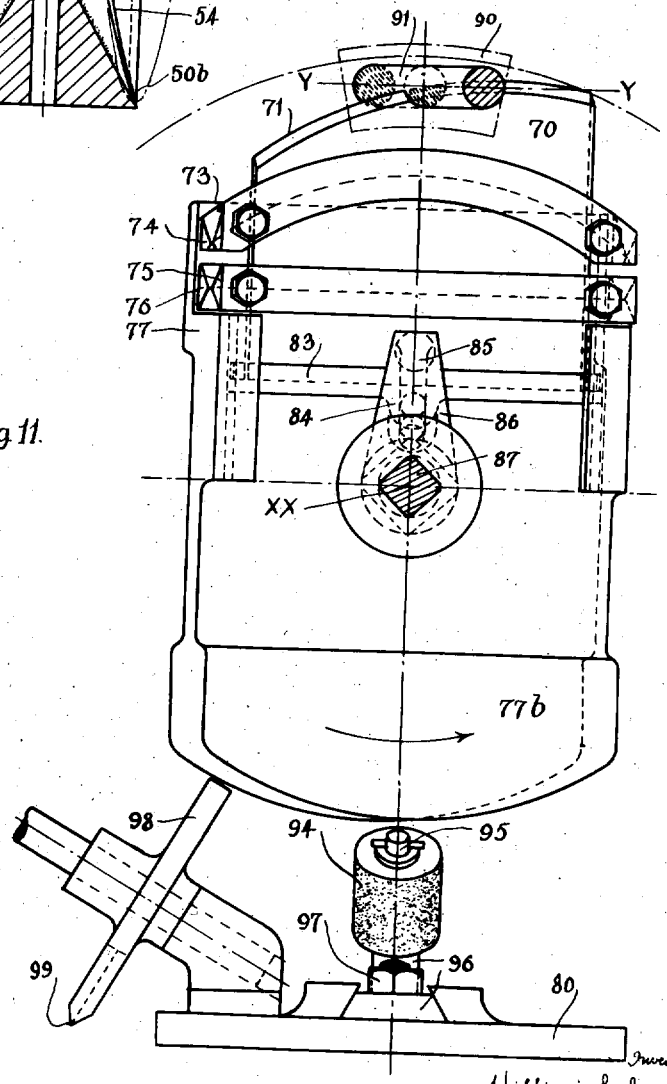
Figure 11 is an end elevation of Figure 10.
Figure 10:
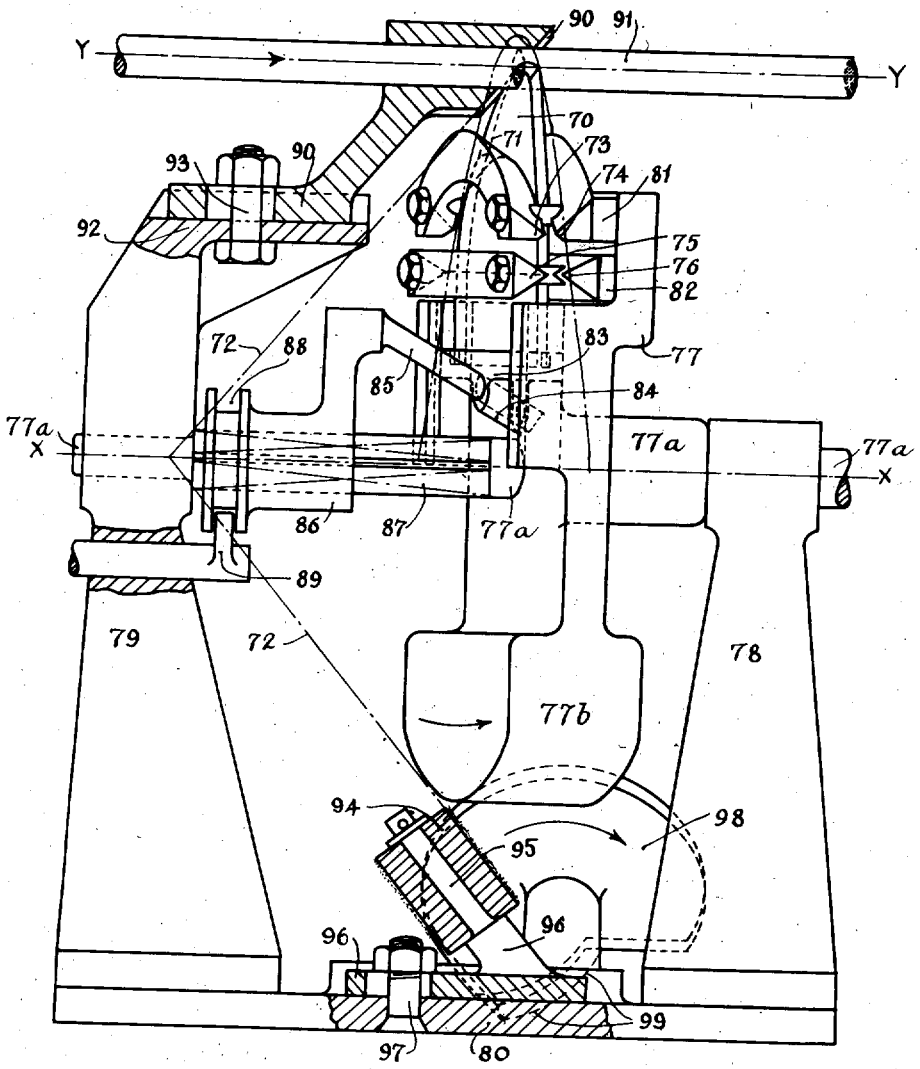
Figure 10 is a part sectional front elevation of a cutting-off mechanism showing one form of helically formed cutter having means for adjusting the pitch of the helix and means for feeding the cutter to compensate for wear; one form of main sharpener; one form of an auxiliary sharpener; and one form of ledger plate, all made in accordance with this invention.
Figure 12:
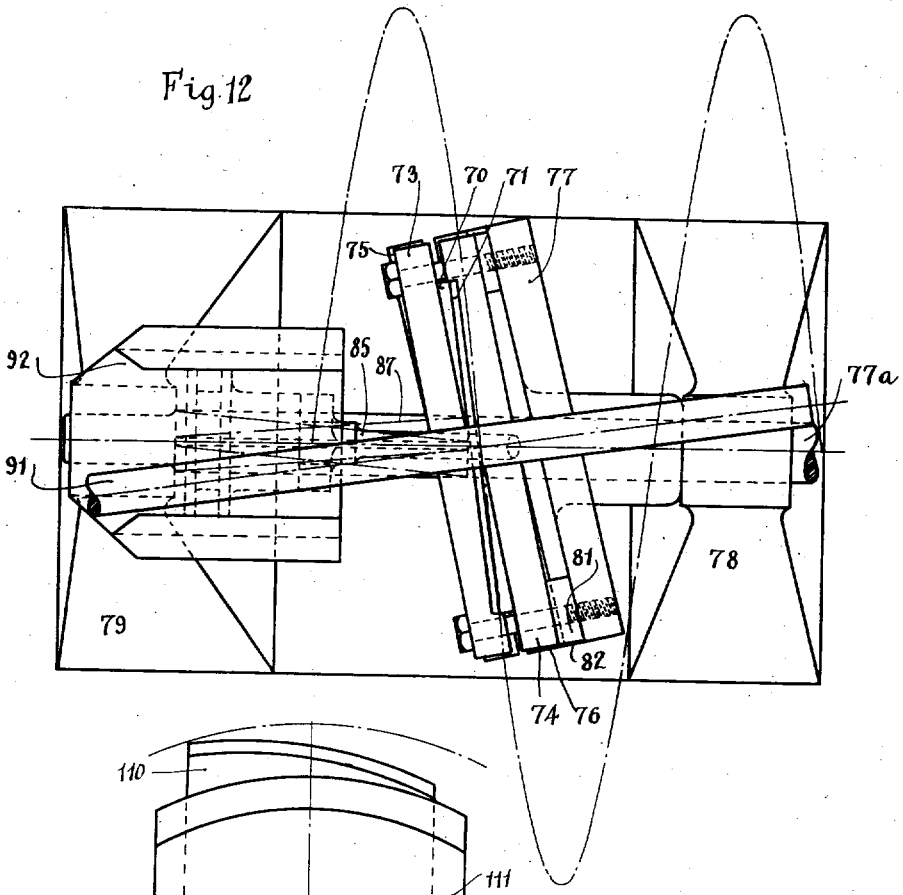
Figure 12 is a plan of Figure 10 with the sharpener, auxiliary sharpener and ledger plate omitted for clearness.

Referring to Figures 10, 11, and 12, the mechanism shown embodies a helical cutter 70 with cutting edge 71 describing a conical surface of revolution 72 about the axis XX, as described with reference to the diagrammatic Figures 7, 8, and 9.

The cutter 70 is made from a thin flexible sheet of steel located between two pairs of adjustable abutments 73, 74, 75, and 76 bolted to the member 77 which is adapted to be revolved with the shaft 77a in the bearings 78 and 79 mounted on the base 80. The member 77 is provided with balance weights 77b. The cutter 70 is warped into the desired helical form by the adjustable abutments and interchangeable distance pieces 81 and 82 are interposed between the abutments 74 and 76 and the member 77 to enable the pitch of the helix to be varied. The adjustable abutments are arranged to permit of the cutter to be fed radially to the axis XX to compensate for wear.

The cutter 70 is secured in a cutter carrier 83 having a boss 84 formed with a hole inclined at an angle to the axis XX (see Figure 10). A pin 85, inclined at the same angle to the axis XX, co-acts with the hole in the boss 84. The pin 85, formed on the operating member 86, is mounted on a squared portion 87 of the shaft 77a and revolves with the cutter. The operating member 86 is formed with a groove 88 which is engaged by an actuating member 89 operated in any convenient manner, not shown.

The ledger plate 90 has a working surface which coincides wholly with the conical surface of revolution 72 and is pierced to permit the passage of the cigarette rod 91. A suitable small clearance may be allowed to prevent the ledger plate 90 from damaging the cutting edge 71. For this purpose the ledger plate is slidably mounted on the bearing bracket 92 and is secured in place by the bolt 93.

The non-oscillating cylindrical sharpener 94 is co-axially mounted on the shaft 95 and is adapted to be rotated thereon The shaft 95 is formed on a bracket 96 slidably mounted on the base 80 to permit the sharpener to be brought into operation or withdrawn, and sufficient movement is provided to allow for wear. The bracket 96 can be secured in the desired position by the bolt 97.

Figure 23:
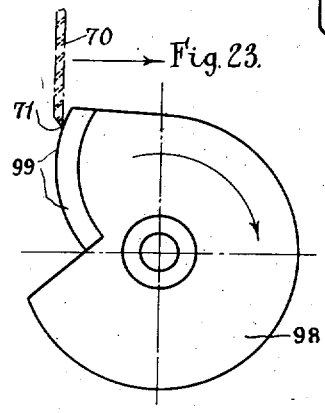
Figure 2:
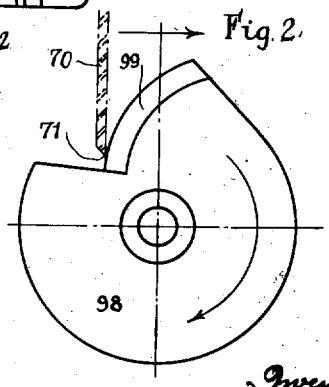

The auxiliary sharpener 98 is in the form of a disc intercepting the path of the cutter 70 and a segmental portion is removed to allow the passage of the cutting edge 71. The sharpener 98 is rotated (by means not shown) synchronously with the cutter 70 and the working surface 99 is formed with a profile arranged to follow the progressive movement of the cutting edge while in contact. The auxiliary sharpener 98 is shown separately in Figures 23 and 24 at the commencement and finish of contact, respectively, with the cutting edge 71. The direction of the progressive movement of the cutter 70 and the rotation of the auxiliary sharpener 98 is shown by the arrows. The function of the auxiliary sharpener 98 is to remove any burr produced by the main sharpener 94 and may be utilized to form a bevel on the cutter 70, so that the cutting edge then lies intermediately between the faces of the cutter. Means (not shown) are provided to adjust the position of the auxiliary sharpener 98 to allow for wear.

Figure 13:
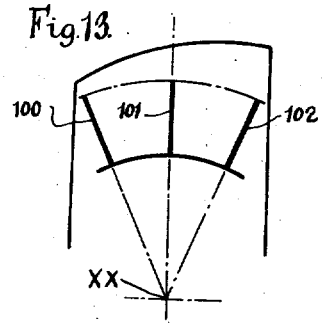
Figure 13 is a diagrammatic elevation.
Figure 14:
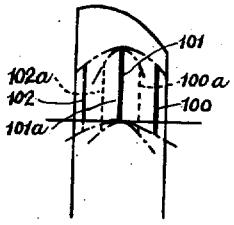
Figure 14 is a diagrammatic end view.
Figure 15:
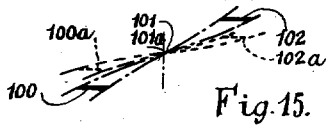
Figure 15 is a diagrammatic plan of one form of the radially arranged locations of the contact surfaces of adjustable abutments for varying the pitch.

Referring now to Figures 13, 14, and 15, it is clear that a radial straight line revolved about an axis and with axial progression describes a helical surface. These figures show, diagrammatically, the application of this fact to an alternative method of producing a true helical surface on the cutter blade by means of adjustable abutments having straight line radially-disposed contact surfaces. In Figure 13 three straight line contact surfaces 100, 101, and 102 are shown radially disposed. Figure 14 shows, in heavy full lines, the relative positions of the radially-disposed adjustable contact surfaces along the axis of the helix. Figure 15 shows, in heavy full lines, the relative positions of the said radially-disposed adjustable contact surfaces.

The dotted lines 100a and 102a in Figures 14 and 15 show these radially-disposed contact surfaces adjusted to a different pitch of helix by only altering the relative axial positions. The contact surface 101 remains unaltered.

Figure 16:
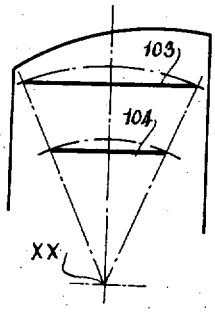
Figure 16 is a diagrammatic end elevation.
Figure 17:
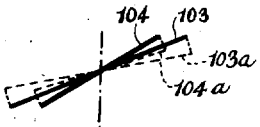
Figure 17 is a diagrammatic plan of an alternative form having the contact surfaces of the adjustable abutments arranged perpendicularly to a radial line.

Referring to Figures 16 and 17, these show, diagrammatically, alternative positions of the contact surface of the adjustable abutments arranged as narrow surfaces 103 and 104 disposed perpendicularly to a radial line, when viewed along the axis XX. The contact surfaces 103 and 104, when viewed along the axis XX, are straight, but coincide with a helical surface of the average pitch required, as shown by full lines in Figure 17. The pitch of the helix is adjusted by swinging the contact surfaces into the positions 103a and 104a as shown by dotted lines in Figure 17.

Figure 18:
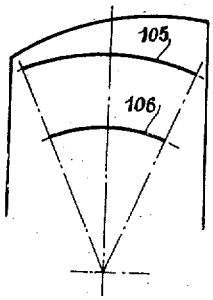
Figure 18 is a diagrammatic end elevation.
Figure 19:
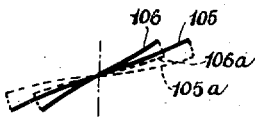
Figure 19 is a diagrammatic plan of another alternative form having the contact surfaces of the adjustable abutments arranged as concentric segments of annuli.

Referring to Figures 18 and 19, the contact surfaces 105 and 106 are arranged as segments of concentric annuli and the pitch is adjusted by swinging the contact surfaces into the positions 105a and 106a, as shown by the dotted lines in Figure 19.

Figure 21:
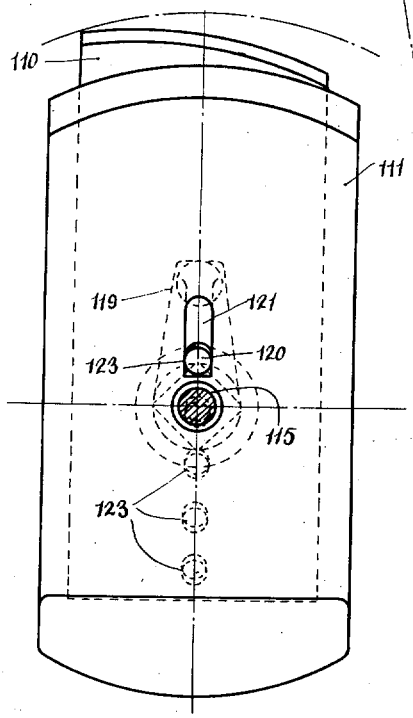
Figure 21 is a diagrammatic end elevation.
Figure 20:
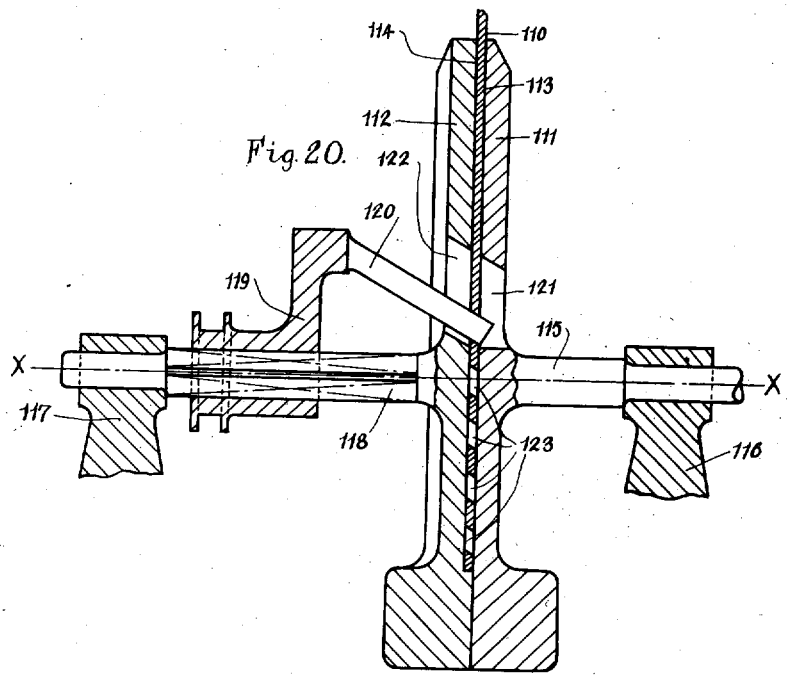
Figure 20 is a diagrammatic sectional front elevation.
Figure 22:
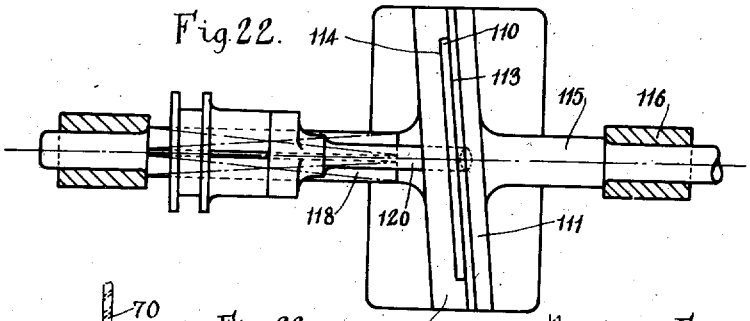
Figure 22 is a diagrammatic plan of one form of cutter feed mechanism in accordance with this invention.

Referring to Figures 20, 21, and 22, the cutter 110 is located between the members 111 and 112 having helically formed surfaces 113 and 114 and adapted to be moved in a radial direction between the said surfaces to compensate for wear. The members 111 and 112 are formed with a shaft 115 revolubly mounted in bearings 116 and 117. Disposed on a squared portion 118 of the shaft 115 is an operating member 119 similar to the operating member 86 on Figure 10 and may be operated in a similar manner. The operating member 119 has an inclined cylindrical pin 120 which passes through slots 121 and 122 in the members 111 and 112 and engages with any one of the five inclined circular holes 123 in the cutter 110. The cutter 110 is fed forward in a radial direction or withdrawn by an axial movement of the operating member 119.

In describing the blade as having a cutting edge formed by a bevelled surface, it is of course intended to include a blade in which this bevelled surface forms a cutting edge by intersection either with the flat opposite side of the blade or with a second bevelled surface formed on the opposite side of the blade. It is also intended that the expression "surface of revolution" shall define a surface which is formed by the rotation of a line about a second line as an axis. In the event the line revolved is straight and intersects the axis, a cone of revolution is formed, and the limiting figures as the angle of intersection is increased or decreased are those of a plane and a cylinder respectively, the letter being contemplated as constituting surfaces of revolution.

A disc affords a plane surface of revolution, it being understood that the term "disc" is employed in this application in the usual sense as defining a flat circular plate or the like.

Having thus described the invention, what is claimed as new and desired to be secured by Letters Patent is:

1. In a cutting off mechanism of the type described and in which a cutter revolving about a fixed axis is employed, means for feeding the cutter to compensate for wear, said means to be operable while the mechanism is in use, the cutter being mounted between guides, said means comprising an operating member arranged to be moved in either direction along the said fixed axis of revolution of the cutter and revolving with the cutter, the said operating member having a surface or surfaces inclined to the fixed axis of revolution which engage with a surface or surfaces with which the cutter is constrained to move.

2. In a cutting-off mechanism of the type described and in which a helically formed cutter revolving about the fixed axis of the helically formed cutter is employed, means for feeding the helically formed cutter to compensate for wear, said means to be operable while the mechanism is in use, the helically formed cutter being mounted between guides, said means comprising an operating member arranged to be moved in either direction along the said fixed axis of revolution and formation of the helically formed cutter and revolving with the said cutter, said operating member having a surface or surfaces inclined to the said fixed axis of revolution, said inclined surface or surfaces engaging with the surface or surfaces with which the cutter is constrained to move.

3. In a cutting-off mechanism of the type described and in which a helically formed cutter revolving about the fixed axis of the helically formed cutter is employed, means for feeding the helically formed cutter to compensate for wear, said means to be operable while the mechanism is in use, the helically formed cutter being mounted between guides, said means comprising an operating member arranged to be moved in either direction along the said fixed axis of revolution and formation of the helically formed cutter and revolving with the said cutter, the said operating member having a surface or surfaces inclined to the said fixed axis of revolution and formation, said inclined surface or surfaces engaging with the surface or surfaces formed upon a carrier to which the helically formed cutter is secured, so that carrier and cutter are constrained to move with the said inclined surface or surfaces formed upon the cutter carrier.

4. In a cutting-off mechanism of the type described and in which a helically formed cutter revolving about the fixed axis of the helically formed cutter is employed, means for feeding the helically formed cutter to compensate for wear, said means to be operable while the mechanism is in use, the helically formed cutter being mounted between guides, said means comprising an operating member arranged to be moved in either direction along the said fixed axis of revolution and formation of the helically formed cutter and revolving with the said cutter, the said operating member having a surface or surfaces inclined to the said fixed axis of revolution and formation, said inclined surface or surfaces engaging with the surface or surfaces formed upon the helically formed cutter, so that the cutter is constrained to move with the said inclined surface or surfaces formed upon the cutter.

5. In a cutting-off mechanism of the type described and in which a cutter revolving about a fixed axis is employed, means for feeding the cutter to compensate for wear, said means to be operable while the mechanism is in use, the cutter being mounted between guides, said means comprising an operating member arranged to be moved in either direction along the said fixed axis of revolution of the cutter and revolving with the cutter, the said operating member having a surface or surfaces inclined to the fixed axis of revolution engaging with a surface or surfaces formed upon a carrier to which the cutter is secured.

6. In a cutting-off mechanism of the type described, a flexible cutter characterized by being warped or twisted into a helical form against adjustable abutments making contact with the cutter upon narrow surfaces radially disposed to the axis of the desired helical form to which the cutter is to be formed, the said abutments being located on at least three different radial positions when viewed along the axis of the helix.

7. In a cutting-off mechanism of the type described, a flexible cutter characterized by being warped or twisted into a helical form against at least one adjustable abutment, each abutment making contact with the cutter upon a narrow surface which, when viewed along the axis of the helix, appears with its length perpendicular to a line radial to the axis of the helix.

8. In a cutting-off mechanism of the type described, a flexible cutter characterized by being warped or twisted into a helical form against at least one adjustable abutment, each abutment making contact with the cutter upon a narrow surface which, when viewed along the axis of the helix, appears with its length as a segment of an annulus concentric with the axis of the helix.

9. In a cutting-off mechanism having a cutting edge and bevelled surface describing a common stationary surface in space, a stationary ledger plate having a working surface contacting with the said stationary described surface with a surface contact lying wholly on the said stationary described surface, means for feeding the cutter to compensate for wear and maintain the said described surface constant in form and size, a sharpener to sharpen said cutter, said sharpener and ledger plate being co-related with each other and with the said stationary described surface of constant form and size.

10. In a cutting-off mechanism of the type described, a cutter, the entire effective cutting edge and bevelled surface of which describe a common surface of revolution about and co-axial with a fixed axis.

11. In a cutting-off mechanism of the type described, a helical cutter, a bevelled surface on said cutter formed by sharpening said cutter, means for revolving said cutter about the axis of the helix, the cutting edge of said cutter and said bevelled surface describing a common stationary surface of revolution formed about and co-axial with the axis of the said helical surfaces, said axis having a fixed location.

12. In a cutting-off mechanism of the type described, a helical cutter, a bevelled surface on said cutter formed by sharpening said cutter, means for revolving said cutter about the axis of the helix, the cutting edge of said cutter and said bevelled surface describing a common stationary surface of revolution defining a cone formed about and co-axial with the axis of the said helical surfaces, said axis having a fixed location.

13. In a cutting-off mechanism of the type described, a cutter, a main sharpener for sharpening said cutter by forming a bevel thereon, the cutting edge and bevelled surface describing a common surface in space, a stationary ledger plate, the working surface of the said main sharpener and said ledger plate being co-related to each other, each making contact with the said stationary surface described through space, the said contacts both lying wholly upon the said stationary described surface.

14. In a cutting-off mechanism of the type described, a cutter having helical surfaces, means for revolving said cutter about the axis of the helices, said axis being fixed, a main sharpener for sharpening said helical cutter by forming a bevel thereon, the cutting edge describing a common stationary surface formed about and co-axial with the said fixed axis, a stationary ledger plate, the working surfaces of said main sharpener and ledger plate being co-related to each other each making a contact with the said co-axial stationary surface of revolution described by the cutting edge, the said contacts both lying wholly upon the said co-axial stationary described surface of revolution, the said cutting edge and ground bevelled surface both sweeping over the working surface of the ledger plate with light contact or a slight clearance.

15. In a cutting-off mechanism of the type described, a cutter, a bevelled surface on said cutter, the cutting edge and said bevelled surface describing a common stationary surface in space and a stationary main sharpener characterized in that the contact between the sharpener and the said stationary described surface is a surface contact lying wholly upon the said stationary described surface.

16. In a cutting-off mechanism of the type described, a cutter, a bevelled surface on said cutter, the cutting edge and said bevelled surface describing a common stationary surface in space and a stationary main sharpener characterized in that the contact between the sharpener and the said stationary described surface is a surface contact lying wholly upon the said stationary described surface, the said main sharpener being stationary and having the whole of the working surface formed to coincide as a whole with that portion of the said stationary described surface where the sharpener is applied.

17. In a cutting-off mechanism of the type described, a cutter, a bevelled surface on said cutter, the cutting edge and said bevelled surface describing a common stationary surface in space and the said stationary described surface being a surface of revolution described about a fixed axis and the said main sharpener being stationary and having the whole of the working surface formed to coincide as a whole with that portion of the said stationary described surface of revolution where the sharpener is applied.

18. In a cutting-off mechanism of the type described, a helically formed cutter, means for revolving said cutter about the axis of the helical surfaces, the location of the said axis being fixed, a bevelled surface on said cutter, the cutting edge and bevelled surfaces describing a common stationary surface of revolution formed about and co-axial with the said fixed axis and a main sharpener, the said main sharpener being stationary and having a working surface formed to coincide as a whole with that portion of the said stationary described co-axial surface of revolution where the said main sharpener is applied.

19. In a cutting-off mechanism of the type described, a helically formed cutter, means for revolving the said cutter about the fixed axis of the helical surfaces, a bevelled surface on said cutter, the cutting edge and bevelled surface describing a common conical surface of revolution formed about and co-axial with the said fixed axis and a main sharpener, the said main sharpener being stationary and having a working surface formed to coincide as a whole with that portion of the said stationary described conical co-axial surface of revolution where the said main sharpener is applied.

20. In a cutting-off mechanism of the type described, a cutter, a bevelled surface on said cutter, a main sharpener to grind said bevelled surface, the said main sharpener having a working surface formed as a surface of revolution about and co-axial with any convenient fixed axis, the said main sharpener contacting with the said stationary described surface with a contact which is a line lying wholly upon the said stationary described surface.

21. In a cutting-off mechanism of the type described, a cutter with surfaces of helical form, means for revolving said cutter about the fixed axis of the helical surfaces, a bevelled surface on said cutter, a main sharpener for grinding said bevelled surface, cutting edge and bevelled surface describing a stationary surface of revolution formed about and co-axial with the fixed axis of the helices, said main sharpener contacting with the said stationary described surface of revolution with a contact which is a line lying wholly upon the said stationary described surface of revolution, said main sharpener having a working surface formed as a surface of revolution about and co-axial with any convenient fixed axis and supporting means for said sharpener to enable the said main sharpener to be rotated about its axis of formation, and means for rotating said sharpener.

22. In a cutting-off mechanism of the type described, a cutter having surfaces of helical form, means for revolving said cutter about the axis of said helical surfaces, the location of the said axis being fixed, the cutting edge describing a stationary surface of revolution formed about and co-axial with the said fixed axis, a main sharpener for sharpening said cutter, an auxiliary sharpener to remove any burr formed by the said main sharpener and means for rotating said auxiliary sharpener about a fixed axis synchronously with the revolving cutter, the said auxiliary sharpener being formed as a disc disposed approximately transversely to and intersecting the said stationary described surface, a working surface forming a part only of the periphery of said disc with a profile arranged to follow the progressive movement of the cutter in the direction normal to the cutter surfaces and sharpen the cutter by removing the burr made on the cutting edge by the said main sharpener.

23. In a cutting-off mechanism of the type described, a cutter, the cutting edge of which describes a stationary surface through space, a bevelled surface to said cutter, the said bevelled surface terminating in the cutting edge, and a stationary ledger plate having a working surface formed to coincide with that portion of the said stationary described surface where the ledger plate is located, the said ledger plate contacting with the cutting edge and the said bevelled surface on the cutter while cutting.

24. In a cutting-off mechanism of the type described, a cutter, a bevelled surface on said cutter, the said bevelled surface terminating in the cutting edge, said cutting edge and bevelled surface describing a common stationary surface of revolution about a fixed axis and a stationary ledger plate having a working surface making surface contact with said stationary described surface.

25. In a cutting-off mechanism of the type described, a cutter, a bevelled surface on said cutter, a main sharpener to grind said bevelled surface, said cutting edge and bevelled surface describing a common stationary surface in space, and a stationary ledger plate having a working surface making surface contact with said stationary described surface, said main sharpener having a working surface making line contact with the said stationary surface, said main sharpener thus being co-related with the ledger plate.

26. In a cutting-off mechanism of the type described, a cutter, a bevelled surface on said cutter, means for operating said cutter, the cutting edge and bevelled surface describing a common stationary surface in space, a main sharpener to sharpen said cutter, said main sharpener being stationary, the working surface of said sharpener coinciding as a whole with the said stationary described surface, the contact between said sharpener and said stationary described surface comprising a surface contact lying wholly upon the said stationary described surface.

27. In a cutting-off mechanism of the type described, a cutter carrier, adjustable abutments on said cutter carrier, a flexible cutter mounted against said abutments by which the said cutter is formed into a portion of a helix, and means for adjusting the said abutments to enable the pitch to be varied to coincide with the predetermined helical form of desired pitch.

28. In a cutting-off mechanism of the type described, a cutter, means for revolving said cutter about a fixed axis, a main sharpener for sharpening said cutter by forming a bevel surface thereon, said cutting edge and bevelled surface describing a common stationary surface of revolution formed about and co-axial with the said fixed axis, and a stationary ledger plate, the working surfaces of the said main sharpener and ledger plate being co-related to each other, each making a contact with the co-axial stationary described surface of revolution, the said contacts both lying wholly upon the said co-axial stationary described surface of revolution, the said cutting edge and bevelled surface of the cutter both sweeping over the working surface of the ledger plate with light contact or slight clearance.

29. In a cutting-off mechanism of the type described, a cutter, a bevelled surface formed on said cutter by sharpening said cutter, means for operating said cutter so as to cause the cutting edge of said cutter to describe a surface of a geometrical figure through space, every portion of said bevelled surface contacting with a portion of the said described surface.

30. In a cutting-off mechanism of the type described, a cutter, a bevelled surface on said cutter, means for operating said cutter, the cutting edge and said bevelled surface describing a common surface of a geometrical figure in space and a main sharpener to sharpen said cutter, the contact between the sharpener and the said described surface comprising a line lying wholly upon the said described surface.

31. In a cutting-off mechanism of the type described, a cutter, means for revolving said cutter about a fixed axis, the cutting edge describing a stationary surface in space, the said stationary described surface being formed about and co-axial with the said fixed axis, a main sharpener for sharpening said cutter, an auxiliary sharpener to remove any burr formed on the cutting edge by the said main sharpener, the working surface of the said auxiliary sharpener having a component of movement equal to and in the same direction as the component of movement of the cutter surfaces in a direction normal to the said cutter surfaces.

32. In apparatus for severing a moving cigarette rod into lengths, the combination with a cutting blade supported for revolving movement about a fixed axis, said blade having a cutting edge formed with a bevelled surface, the leading portion of the cutting edge being of less radial distance from the fixed axis than the following portion thereof, the point of engagement of the blade and the rod moving with the latter, and a sharpener occupying a stationary position and having a surface contacting the bevelled surface of the blade, the point of contact of the blade and sharpener being progressively displaced axially and radially with respect to the axis about which the blade is revolved.

33. In apparatus for severing a moving cigarette rod into lengths, the combination with a cutting blade supported for revolving movement about a fixed axis, said blade having a cutting edge formed with a bevelled surface describing at least a portion of a surface of revolution in space, the leading portion of the cutting edge being of less radial distance from the fixed axis than the following portion thereof, and a sharpener supported against bodily displacement and having a portion thereof coinciding in part with the described portion of the surface of revolution.

34. In apparatus for severing a moving cigarette rod into lengths, the combination with a cutting blade supported for revolving movement about a fixed axis, said blade having a cutting edge formed with a bevelled surface describing at least a portion of a surface of revolution in space, the leading portion of the cutting edge being of less radial distance from the fixed axis than the following portion thereof, and a sharpener having a grinding surface formed as a surface of revolution and supported against bodily displacement, said sharpener being so supported that a portion of the grinding surface thereof coincides in part with the described portion of the surface of revolution.

35. In apparatus for severing a moving cigarette rod into lengths, the combination with a blade having a peripheral arcuate cutting edge formed with a bevelled surface on one side thereof, of means for imparting to the blade a movement such that the blade rotates about a fixed axis while the successive points of contact between the blade and the rod lie along the length of the rod, the leading portion of the cutting edge being of less radial distance from the said axis than the following portion thereof, the relation of the difference in radius of the leading and following portions of the cutting edge, the bevel angle of the cutting edge, and the rates of movement of revolution and translation imparted to the blade being such that the bevelled surface of the blade describes at least a portion of a surface of revolution in space, and a sharpener supported against bodily displacement and having a surface positioned to coincide at least in part with the surface of revolution.

36. In apparatus for severing a moving cigarette rod into lengths, the combination with a blade having a peripheral arcuate cutting edge formed with a bevelled surface on one side thereof, of means for imparting to the blade a movement such that the blade rotates about a fixed axis while the successive points of contact between the blade and the rod lie along the length of the rod, the leading portion of the cutting edge being of less radial distance from the said axis than the following portion thereof, the relation of the difference in radius of the leading and following portions of the cutting edge, the bevel angle of the cutting edge, and the rate of movement imparted to the blade being such that the bevelled surface of the blade describes at least a portion of a surface of revolution in space, and a grinding disc supported against bodily displacement and having one flat surface thereof positioned to intersect the said surface of revolution.

37. In apparatus for severing a moving cigarette rod into lengths, the combination with a blade having a peripheral arcuate cutting edge formed with a bevelled surface on one side thereof, of means for imparting to the blade a movement such that the blade rotates about a fixed axis while the successive points of contact between the blade and the rod lie along the length of the rod, the leading portion of the cutting edge being of less radial distance from the said axis than the following portion thereof, the relation of the difference in radius of the leading and following portions of the cutting edge, the bevel angle of the cutting edge, and the rate of movement imparted to the blade being such that the bevelled surface of the blade describes at least a portion of a surface of revolution in space, and a sharpener having a surface disposed substantially tangentially of the said surface of revolution for engagement with the bevelled surface of the blade during movement of the latter.

38. In apparatus for severing a moving cigarette rod into lengths, the combination with a blade having a peripheral arcuate cutting edge formed with a bevelled surface on one side thereof, of means for imparting to the blade a movement such that the blade rotates about a fixed axis while the successive points of contact between the blade and the rod lie along the length of the rod, the leading portion of the cutting edge being of less radial distance from the said axis than the following portion thereof, and a sharpener occupying a fixed position in space and supported for engagement with the bevelled surface of the blade during movement of the latter.

39. In apparatus for severing a moving cigarette rod into lengths, the combination with a blade having a peripheral arcuate cutting edge formed with a bevelled surface on one side thereof, of means for imparting to the blade a movement such that the blade rotates about a fixed axis while the successive points of contact between the blade and the rod lie along the length of the rod, the leading portion of the cutting edge being of less radial distance from the said axis than the following portion thereof, and a sharpener occupying a fixed position in space and supported for engagement with the bevelled surface of the blade during movement of the latter, said shapener comprising a rotatable disc having one flat surface thereof inclined with respect to the blade axis in the direction of movement of the blade while engaged by the disc.

40. In apparatus for severing a moving cigarette rod into lengths, the combination with a blade having a peripheral arcuate cutting edge formed with a bevelled surface on one side thereof, of means for imparting to the blade a movement such that the blade rotates about a fixed axis while the successive points of contact between the blade and the rod lie along the length of the rod, the leading portion of the cutting edge being of less radial distance from the said axis than the following portion thereof, and a sharpener occupying a fixed position in space and supported for engagement with the bevelled surface of the blade during movement of the latter, said sharpener comprising a rotatable disc having one flat surface thereof inclined with respect to the blade axis in the direction of movement of the blade while engaged by the disc, the angle of inclination of the disc corresponding substantially to the bevel angle of the blade, whereby the disc may contact the bevelled surface over the entire depth of the latter as measured in a generally radial direction.

41. In apparatus for severing a moving cigarette rod, the combination with a revolving cutting blade having a cutting edge of generally spiral outline formed with a bevelled surface at one side of the blade of which the point of engagement between the blade and the rod is displaced with the rod, of a sharpener, and means supporting the sharpener in a fixed position for contact with the bevelled surface of the blade at points shifting progressively in a generally radial and axial direction during engagement of the blade and sharpener.

42. In apparatus for severing a moving cigarette rod into lengths, the combination with a blade having a peripheral arcuate cutting edge formed with a bevelled surface on one side thereof, of means for imparting to the blade a movement such that the blade rotates about a fixed axis while the successive points of contact between the blade and the rod lie along the length of the rod, the leading portion of the cutting edge being of less radial distance from the said axis than the following portion thereof, the relation of the difference in radius of the leading and following portions of the cutting edge, the bevel angle of the cutting edge, and the rate of movement imparted to the blade being such that the bevelled surface of the blade describes at least a portion of a cone of revolution in space having the axis thereof substantially coincident with the fixed axis about which the blade revolves, and a sharpener supported against bodily displacement and having a surface coinciding in part with at least one element of the cone.

43. In apparatus for severing a moving cigarette rod into lengths, the combination with a rotating cutting blade having a cutting edge of generally spiral outline as viewed axially, said cutting edge being formed with a bevelled surface at one side of the blade of which the point of engagement between the blade and the rod is displaced with the rod, of a sharpener, and means supporting the sharpener in a fixed position for contact with the entire effective cutting edge and bevelled surface of the blade during rotation of the latter.

44. In a cigarette rod severing mechanism of the type in which the rod is fed axially during the severing operation, the combination with a rotatable cutter having a bevelled cutting edge progressively increasing in radius in a direction opposite to the direction of rotation of the cutter and describing a surface defining a geometrical figure in space, the point of intersection of the cutting edge of the cutter with any given plane containing the axis of the cutter being progressively displaced axially and radially of the cutter during rotation of the latter, whereby the point of engagement of the cutter with the rod may be shifted with the rod during the severing operation, of a sharpening member, and means supporting the sharpening member in fixed position with a portion of the surface thereof coinciding with a portion of the said described surface and in engagement with the said cutting edge during a part of the said progressive axial and radial displacement of the point of intersection thereof with the said plane.

45. In a cigarette rod severing mechanism of the type in which the rod is fed axially during the severing operation, the combination with a rotatable cutter having a bevelled cutting edge progressively increasing in radius in a direction opposite to the direction of rotation of the cutter, the point of intersection of the cutting edge of the cutter with any given plane containing the axis of the cutter being progressively displaced axially and radially of the cutter in a substantially straight line during rotation of the cutter, whereby the point of engagement of the cutter with the rod may be shifted with the rod during the severing operation, of a sharpening member, and means supporting the sharpening member in fixed position with a portion of the surface thereof in substantial coincidence with a portion of the said straight line and in engagement with the said cutting edge during a part of the said progressive axial and radial displacement of the point of intersection thereof with the said plane.

46. In a cigarette rod severing mechanism of the type in which the rod is fed axially during the severing operation, the combination with a rotatable cutter having a bevelled cutting edge progressively increasing in radius in a direction opposite to the direction of rotation of the cutter, the point of intersection of the cutting edge of the cutter with any given plane containing the axis of the cutter being progressively displaced axially and radially of the cutter during rotation of the latter, whereby the point of engagement of the cutter with the rod may be shifted with the rod during the severing operation, of a sharpening member, and means supporting the sharpening member against bodily displacement with at least a portion of the surface thereof positioned for engagement with the entire effective bevelled cutting edge while the point of intersection of the latter with a given plane containing the cutter axis is undergoing progressive displacement axially and radially of the cutter.

47. In apparatus for severing a moving cigarette rod, the combination with a rotating cutting blade having a cutting edge of generally spiral outline as viewed axially, said cutting edge being formed with a bevelled surface at one side of the blade of which the point of engagement between the blade and the rod is displaced with the rod, of a sharpener, and means supporting the sharpener in a fixed position for contact with the entire effective cutting edge and bevelled surface of the blade during rotation of the latter.

WILLIAM COLE.